United States Patent
Sasaki et al.

(10) Patent No.: US 8,605,153 B2
(45) Date of Patent: Dec. 10, 2013

(54) IMAGE ADJUSTING DEVICE, IMAGE ADJUSTING METHOD, AND ON-VEHICLE CAMERA

(75) Inventors: Tetsuya Sasaki, Kanagawa (JP); Ryosuke Kasahara, Kanagawa (JP); Go Maruyama, Kanagawa (JP); Hiroyoshi Sekiguchi, Kanagawa (JP); Xue Li, Kanagawa (JP); Masahiko Itoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 661 days.

(21) Appl. No.: 12/715,680

(22) Filed: Mar. 2, 2010

(65) Prior Publication Data

US 2010/0231717 A1  Sep. 16, 2010

(30) Foreign Application Priority Data

Mar. 16, 2009 (JP) ................... 2009-063420
Dec. 22, 2009 (JP) ................... 2009-290955

(51) Int. Cl.
 *H04N 7/18* (2006.01)
(52) U.S. Cl.
 USPC ............................................. 348/148
(58) Field of Classification Search
 USPC .................. 348/148; 382/104; 340/932.2
 IPC ........................................... H04N 7/18
 See application file for complete search history.

(56) References Cited

U.S. PATENT DOCUMENTS

| 7,053,795 | B2 * | 5/2006 | Maemura et al. ......... 340/932.2 |
| 7,075,456 | B2 * | 7/2006 | Tanaka et al. ............. 340/932.2 |
| 7,117,073 | B2 * | 10/2006 | Endo et al. ....................... 701/28 |
| 7,486,203 | B2 * | 2/2009 | Tanaka et al. ............. 340/932.2 |
| 7,555,379 | B2 * | 6/2009 | Endo et al. ....................... 701/41 |
| 7,599,773 | B2 * | 10/2009 | Tanaka et al. .................. 701/36 |
| 7,706,944 | B2 * | 4/2010 | Tanaka et al. .................. 701/41 |
| 7,813,855 | B2 * | 10/2010 | Watanabe et al. .............. 701/41 |
| 8,018,488 | B2 * | 9/2011 | Yuasa ........................... 348/118 |
| 8,035,531 | B2 * | 10/2011 | Yoshihashi et al. ....... 340/932.2 |
| 8,126,625 | B2 * | 2/2012 | Makino et al. .................. 701/65 |
| 8,130,120 | B2 * | 3/2012 | Kawabata et al. ........... 340/908 |
| 8,180,525 | B2 * | 5/2012 | Luke et al. ...................... 701/36 |

(Continued)

FOREIGN PATENT DOCUMENTS

| JP | 7-271958 | 10/1995 |
| JP | 2002-262156 | 9/2002 |

(Continued)

OTHER PUBLICATIONS

Japanese Office Action issued Mar. 6, 2013, in Japan Patent Application No. 2009-290955.

*Primary Examiner* — Tung Vo
(74) *Attorney, Agent, or Firm* — Oblon, Spivak, McClelland, Maier & Neustadt, L.L.P.

(57) ABSTRACT

An image adjusting device for an on-vehicle camera mounted on a vehicle includes an operations unit configured to input mounting position information regarding a mounting position of the on-vehicle camera on the vehicle; a storing unit configured to store image processing parameters in association with various mounting positions of the on-vehicle camera; a control unit configured to read the corresponding image processing parameters from the storing unit based on the mounting position information input from the operations unit; and an image processing unit configured to process image data obtained by an imaging unit of the on-vehicle camera according to the image processing parameters read by the control unit.

13 Claims, 18 Drawing Sheets

(56) References Cited

U.S. PATENT DOCUMENTS

| | | | |
|---|---|---|---|
| 8,280,665 B2 * | 10/2012 | Nakamura et al. | 702/95 |
| 8,299,942 B2 * | 10/2012 | Ko et al. | 340/932.2 |
| 8,319,663 B2 * | 11/2012 | Von Reyher et al. | 340/932.2 |
| 8,374,749 B2 * | 2/2013 | Tanaka | 701/41 |
| 2002/0110262 A1 * | 8/2002 | Iida et al. | 382/104 |
| 2008/0309763 A1 * | 12/2008 | Hongo | 348/148 |

FOREIGN PATENT DOCUMENTS

| | | |
|---|---|---|
| JP | 3448443 | 7/2003 |
| JP | 3551920 | 5/2004 |
| JP | 2008-301227 | 12/2008 |

* cited by examiner

FIG.8

| | INITIAL POINT (X) | INITIAL POINT (Y) | END POINT (X) | END POINT (Y) |
|---|---|---|---|---|
| VEHICLE WIDTH LINE 1 (LEFT) | 248 | 120 | 128 | 360 |
| VEHICLE WIDTH LINE 2 (RIGHT) | 392 | 120 | 512 | 360 |
| DISTANCE REFERENCE LINE 1 (2 m) | 228 | 160 | 412 | 160 |
| DISTANCE REFERENCE LINE 2 (1 m) | 200 | 220 | 440 | 220 |
| DISTANCE REFERENCE LINE 3 (0.5 m) | 150 | 320 | 490 | 320 |

FIG.11

| | INITIAL POINT (X) | INITIAL POINT (Y) | END POINT (X) | END POINT (Y) |
|---|---|---|---|---|
| VEHICLE WIDTH LINE 1 (LEFT) | 272 | 120 | 60 | 328 |
| VEHICLE WIDTH LINE 2 (RIGHT) | 432 | 120 | 640 | 288 |
| DISTANCE REFERENCE LINE 1 (2 m) | 232 | 160 | 480 | 160 |
| DISTANCE REFERENCE LINE 2 (1 m) | 160 | 232 | 560 | 232 |
| DISTANCE REFERENCE LINE 3 (0.5 m) | 100 | 280 | 640 | 280 |

FIG.17

| VEHICLE WIDTH INFORMATION [mm] | MOUNTING ANGLE [degrees] | MOUNTING HEIGHT [cm] | GRAPHIC PROCESSING PARAMETERS (DISTANCE BETWEEN VEHICLE WIDTH LINES, ANGLES OF VEHICLE WIDTH LINES, AND POSITIONS OF DISTANCE REFERENCE LINES) |
|---|---|---|---|
| 1500 | 30 | 40 | 1 |
| | | 60 | 2 |
| | | 80 | 3 |
| | | 100 | 4 |
| | | 120 | 5 |
| | | 140 | 6 |
| | | 160 | 7 |
| | 45 | 40 | 8 |
| | | 60 | 9 |
| | | 80 | 10 |
| | | 100 | 11 |
| | | 120 | 12 |
| | | 140 | 13 |
| | | 160 | 14 |
| | 60 | 40 | 15 |
| | | 60 | 16 |
| | | 80 | 17 |
| | | 100 | 18 |
| | | 120 | 19 |
| | | 140 | 20 |
| | | 160 | 21 |
| 1600 | 30 | 40 | 22 |
| | | 60 | 23 |
| | | 80 | 24 |
| | | 100 | 25 |
| | | 120 | 26 |
| | | 140 | 27 |
| | | 160 | 28 |
| | 45 | 40 | 29 |
| | | 60 | 30 |
| | | 80 | 31 |
| | | 100 | 32 |
| | | 120 | 33 |
| | | 140 | 34 |
| | | 160 | 35 |
| | 60 | 40 | 36 |
| | | 60 | 37 |
| | | 80 | 38 |
| | | 100 | 39 |
| | | 120 | 40 |
| | | 140 | 41 |
| | | 160 | 42 |
| 1700 | 30 | 40 | 43 |
| | | 60 | 44 |
| | | 80 | 45 |
| | | 100 | 46 |
| | | 120 | 47 |
| | | 140 | 48 |
| | | 160 | 49 |
| | 45 | 40 | 50 |
| | | 60 | 51 |
| | | 80 | 52 |
| | | 100 | 53 |
| | | 120 | 54 |
| | | 140 | 55 |
| | | 160 | 56 |
| | 60 | 40 | 57 |
| | | 60 | 58 |
| | | 80 | 59 |
| | | 100 | 60 |
| | | 120 | 61 |
| | | 140 | 62 |
| | | 160 | 63 |

FIG.18

| | INITIAL POINT (X) | INITIAL POINT (Y) | END POINT (X) | END POINT (Y) |
|---|---|---|---|---|
| VEHICLE WIDTH LINE 1 (LEFT) | 248 | 120 | 128 | 360 |
| VEHICLE WIDTH LINE 2 (RIGHT) | 392 | 120 | 512 | 360 |
| DISTANCE REFERENCE LINE 1 (2 m) | 228 | 160 | 412 | 160 |
| DISTANCE REFERENCE LINE 2 (1 m) | 200 | 220 | 440 | 220 |
| DISTANCE REFERENCE LINE 3 (0.5 m) | 150 | 320 | 490 | 320 |

FIG.19

| | INITIAL POINT (X) | INITIAL POINT (Y) | END POINT (X) | END POINT (Y) |
|---|---|---|---|---|
| VEHICLE WIDTH LINE 1 (LEFT) | 272 | 160 | 112 | 340 |
| VEHICLE WIDTH LINE 2 (RIGHT) | 368 | 160 | 528 | 340 |
| DISTANCE REFERENCE LINE 1 (2 m) | 248 | 192 | 392 | 192 |
| DISTANCE REFERENCE LINE 2 (1 m) | 200 | 240 | 440 | 240 |
| DISTANCE REFERENCE LINE 3 (0.5 m) | 150 | 320 | 520 | 320 |

FIG.20

| MOUNTING ANGLE [degrees] | MOUNTING HEIGHT [cm] | MOUNTING POSITION DEVIATION (IN VEHICLE WIDTH DIRECTION) [cm] | IMAGE PROCESSING PARAMETERS (HORIZONTAL POSITIONS AND OVERHEAD IMAGE PROCESSING PARAMETERS) |
|---|---|---|---|
| 30 | 40 | -30 | 1 |
| | | -20 | 2 |
| | | -10 | 3 |
| | | 0 | 4 |
| | | 10 | 5 |
| | | 20 | 6 |
| | | 30 | 7 |
| | 60 | -30 | 8 |
| | | -20 | 9 |
| | | -10 | 10 |
| | | 0 | 11 |
| | | 10 | 12 |
| | | 20 | 13 |
| | | 30 | 14 |
| | 80 | -30 | 15 |
| | | -20 | 16 |
| | | -10 | 17 |
| | | 0 | 18 |
| | | 10 | 19 |
| | | 20 | 20 |
| | | 30 | 21 |
| 45 | 40 | -30 | 22 |
| | | -20 | 23 |
| | | -10 | 24 |
| | | 0 | 25 |
| | | 10 | 26 |
| | | 20 | 27 |
| | | 30 | 28 |
| | 60 | -30 | 29 |
| | | -20 | 30 |
| | | -10 | 31 |
| | | 0 | 32 |
| | | 10 | 33 |
| | | 20 | 34 |
| | | 30 | 35 |
| | 80 | -30 | 36 |
| | | -20 | 37 |
| | | -10 | 38 |
| | | 0 | 39 |
| | | 10 | 40 |
| | | 20 | 41 |
| | | 30 | 42 |
| 60 | 40 | -30 | 43 |
| | | -20 | 44 |
| | | -10 | 45 |
| | | 0 | 46 |
| | | 10 | 47 |
| | | 20 | 48 |
| | | 30 | 49 |
| | 60 | -30 | 50 |
| | | -20 | 51 |
| | | -10 | 52 |
| | | 0 | 53 |
| | | 10 | 54 |
| | | 20 | 55 |
| | | 30 | 56 |
| | 80 | -30 | 57 |
| | | -20 | 58 |
| | | -10 | 59 |
| | | 0 | 60 |
| | | 10 | 61 |
| | | 20 | 62 |
| | | 30 | 63 |

IMAGE ADJUSTING DEVICE, IMAGE ADJUSTING METHOD, AND ON-VEHICLE CAMERA

BACKGROUND OF THE INVENTION

1. Field of the Invention

A certain aspect of the present invention relates to an on-vehicle camera mounted on a vehicle and a technology for adjusting an image taken by the on-vehicle camera.

2. Description of the Related Art

An on-vehicle camera is mounted, for example, on the rear, front, or side of a vehicle and used to take images of scenes surrounding the vehicle and to display the images on a monitor provided in the vehicle. Such an on-vehicle camera allows a driver to see images of blind spots on a monitor and thereby assists the driver, for example, in driving a vehicle backward or in looking right and left at a blind intersection. Also, there is a known technology for superposing graphics, such as vehicle width lines indicating the width of a vehicle and distance reference lines indicating distances from the rear end of a vehicle, on an image taken by a camera and displaying the image together with the superposed graphics on a monitor. For example, this technology allows a driver to estimate a parking position or to intuitively understand a distance to an obstacle.

An image taken by an on-vehicle camera has to be adjusted according to the mounting position, height, and/or angle of the camera on a vehicle. For example, if the mounting position of an on-vehicle camera is off center in the width direction of a vehicle, it is necessary to correct an image taken by the on-vehicle camera such that the center line in the horizontal direction of the image on a monitor is aligned with a point on an extension of the center line in the width direction of the vehicle. Without the correction, the center in the width direction of the vehicle and the center in the horizontal direction of the image on the monitor are misaligned. This in turn makes it difficult for a driver to drive the vehicle. Similarly, to properly generate and display an overhead image as seen from above a vehicle by image processing, it is necessary to select proper image processing parameters according to the mounting height and/or angle of an on-vehicle camera. Also, when superposing graphics, such as vehicle width lines indicating the width of a vehicle and/or distance reference lines indicating distances from the rear end of the vehicle, on an image taken by an on-vehicle camera, it is necessary to adjust positions and angles of the superposed graphics according to the size of the vehicle and the mounting position of the on-vehicle camera.

In the related art, such adjustments are performed by the user. For example, objects are placed on a parking space to indicate the width of and distances from a vehicle, and with reference to the objects, the user adjusts the center position of an image, optimizes an overhead image, and adjusts the positions and angles of vehicle width lines and distance reference lines by using buttons or a touch panel display (see, for example, patent document 1). Adjustments that have to be done include horizontal position adjustment for correcting a shift of an image in the width direction of a vehicle, look-down angle adjustment for adjusting the look-down angle of an overhead image, width-line horizontal position adjustment for adjusting the center position of vehicle width lines, width-line distance adjustment for adjusting the distance between vehicle width lines, width-line angle adjustment for adjusting the angles of vehicle width lines, and distance reference line adjustment for adjusting the positions of distance reference lines. Obviously, it is troublesome for a user to make these complex adjustments.

Patent document 2 discloses a technology where display positions of graphics are adjusted based on the shape of a vehicle body and the mounting position of an on-vehicle camera that are input by a user. In the disclosed technology, display positions of distance marks indicating distances from the rear end of a vehicle are determined based on the mounting height of a camera. Generally, however, graphics to be superposed on an image include not only distance reference lines (corresponding to the distance marks in patent document 2) indicating distances but also vehicle width lines indicating the width of a vehicle. Therefore, it is not enough to determine only the display positions of distance marks.

In patent document 2, the angle (pitch angle) of a camera is fixed such that the bumper is in the sight of the camera and the mounting height (Y) is varied to determine the display positions of distance marks. However, an image taken by a camera may also be shifted (or deformed) due to the mounting position (X) of the camera in the vehicle width direction, the mounting angle (yaw angle) of the camera in the horizontal direction, and the rotation angle (roll angle) of the camera. Therefore, it is necessary to correct the image based on the amount of shift and also to adjust the display positions of graphics such as vehicle width lines and distance reference lines to be superposed on the corrected image. Also, if the mounting height of a camera is changed, a displayed overhead image may be distorted. Further, the distance between vehicle width lines to be superposed on an image may have to be varied depending on the width of a vehicle on which a camera is mounted.

Particularly, when a camera is to be retrofitted to a vehicle, i.e., when the type of vehicle the camera is to be mounted on and/or the mounting position of the camera are not predetermined, it is more important to correct images and adjust the positions of superposed graphics.

[Patent document 1] Japanese Patent No. 3551920
[Patent document 2] Japanese Patent No. 3448443

For better understanding of the present invention, a related-art on-vehicle camera is described below with reference to the accompanying drawings.

FIG. 1 is a block diagram illustrating a hardware configuration of a related-art on-vehicle camera. FIG. 2 is a drawing illustrating various mounting angles (pitch angles) of the on-vehicle camera.

As shown in FIG. 1, the related-art on-vehicle camera includes an imaging unit 10. The imaging unit 10 includes at least an imaging element and a lens. The imaging unit 10 obtains image data of a scene behind the vehicle by focusing light with the lens on the imaging element. The imaging element is, for example, implemented by a charge-coupled device (CCD) image sensor or a complementary metal oxide semiconductor (CMOS) image sensor. The image data obtained by the imaging unit 10 are normally color (RGB) image data with a Bayer pattern, but may instead be monochrome image data.

The imaging unit 10 sends the obtained image data to an image processor 30. The image processor 30 includes an image processing unit 31 and a graphic superposing unit 32. The image processing unit 31 performs image processing on the image data sent from the imaging unit 10. The image processing, for example, includes Bayer interpolation, correction of chromatic aberration of magnification, YUV conversion, distortion correction, and overhead image generation. The graphic superposing unit 32 superposes graphics such as vehicle width lines and distance reference lines on the image data. More particularly, the image processing unit 31 and the graphic superposing unit 32 perform the above processing based on parameters (or adjustment values) stored in a user information storing unit 40.

The image processor 30 is, for example, implemented by an application specific integrated circuit (ASIC), a field programmable gate array (FPGA), and/or a digital signal processor (DSP). Alternatively, the image processor 30 may be implemented by a software program executed by a central processing unit (CPU).

An operations unit 20 is a user interface for correcting an image and may be implemented by buttons or a touch panel display. The operations unit 20 allows the user to adjust the horizontal position of an image and the look-down angle of an overhead image, and to set parameters of graphics such as vehicle width lines and distance reference lines. Image adjustment values and graphic adjustment values input by the user are stored in the user information storing unit 40. When the on-vehicle camera is turned on the next time, the adjustment values are read from the user information storing unit 40, and image data and graphics are adjusted based on the adjustment values. When the on-vehicle camera is turned on for the first time, factory default adjustment values are used.

The user information storing unit 40 is a rewritable non-volatile memory and may be implemented, for example, by an electrically erasable programmable read-only memory (EEPROM) or a flash memory.

The processed image data with superposed graphics such as vehicle width lines and distance reference lines are sent to a digital-to-analog converter (DAC) 50. The DAC 50 converts the image data from digital to analog and outputs the converted image data as an NTSC (National Television System Committee) signal to an external display device 60 such as a monitor.

FIG. 3 is a drawing illustrating display modes of the on-vehicle camera that are switched by the operations unit 20. Here, it is assumed that the operations unit 20 includes two buttons A and B (not shown).

The on-vehicle camera mounted on the rear of the vehicle is used, for example, to assist driving in reverse. For example, the on-vehicle camera is turned on when the shift lever is shifted to the reverse gear (R) while the engine is running. When the on-vehicle camera is turned on, a normal view in a normal display mode shown in FIG. 3 is selected and an image of a scene behind the vehicle is displayed on the display device 60 (monitor) in the vehicle. In the normal display mode, pressing the button A switches views clockwise and pressing the button B switches views counterclockwise. When the button A is pressed while the normal view is selected, a top view is selected and an overhead image as seen from above the vehicle is displayed. When the button A is pressed again, a side view is selected and an image of scenes to the right and left of the vehicle is displayed. When the button A is pressed in the side view, a wide view is selected and an image with a view angle wider than that in the normal view is displayed. When the button A is pressed yet again, the normal view is selected again.

In the normal, wide, and top views, vehicle width lines indicating the width of the vehicle and distance reference lines indicating distances from the rear end of the vehicle are superposed on the image as shown in FIG. 4.

An adjustment mode of the on-vehicle camera is described below. Generally, an on-vehicle camera has an adjustment mode used before the factory shipment or when the on-vehicle camera is initially mounted on a vehicle to adjust images and superposed graphics based on the mounting position and angle of the on-vehicle camera and the type or width of the vehicle. For example, simultaneously pressing the buttons A and B for two or more seconds while in the normal display mode causes the on-vehicle camera to switch from the normal display mode to the adjustment mode. In the adjustment mode, for example, the button A is used to increase an adjustment value and the button B is used to decrease an adjustment value. Also in the adjustment mode, pressing the button A for two or more seconds switches adjustment menus clockwise and pressing the button B for two or more seconds switches adjustment menus counterclockwise. Simultaneously pressing the buttons A and B again for two or more seconds saves modified adjustment values in the user information storing unit 40 and causes the on-vehicle camera to return to the normal display mode.

When the on-vehicle camera is switched to the adjustment mode, an "image horizontal position adjustment" menu is selected. Pressing the button A while the "image horizontal position adjustment" menu is selected moves an image displayed on the monitor two pixels to the right. Meanwhile, pressing the button B moves the image two pixels to the left. Thus, it is possible to adjust the horizontal position of an image on the monitor by operating the buttons A and B. As described above, pressing either the button A or B for two or more seconds selects the next adjustment menu.

A "look-down angle adjustment" menu is used to change an image processing parameter corresponding to the vertical angle (pitch angle) of the on-vehicle camera with respect to the ground surface. For example, it is necessary to set different image processing parameters for vertical angles of 30, 45, and 60 degrees to properly generate and display a top view image (i.e., an overhead image). The image processing parameter is adjusted, for example, such that side lines defining a parking space in the overhead image become parallel to each other as seen from above the vehicle. If markers are placed in a parking space as described later, the image processing parameter is adjusted such that virtual lines connecting the markers form a rectangle. Here, the vertical angle of the on-vehicle camera with respect to the ground surface is calculated based on an assumption that the horizontal direction indicates 0 degrees (30 degrees and 45 degrees in FIG. 2 indicate exemplary vertical angles).

A "width-line horizontal position adjustment" menu is used to adjust horizontal positions of the vehicle width lines and the distance reference lines with respect to the image. A "width-line angle adjustment" menu is used to adjust the angles of the right and left vehicle width lines with respect to the image. A "width-line distance adjustment" menu is used to adjust the distance between the right and left vehicle width lines.

A "distance reference line adjustment" menu is used to adjust the positions of distance reference lines in the vertical direction on the monitor. In FIG. 3, three distance reference lines (0.5 m line, 1 m line, and 2 m line) are shown. The positions of distance reference lines may be adjusted independently or collectively.

Here, an exemplary method of adjusting an image is described. FIG. 5 is a top view of a parking space and a vehicle. In the example shown in FIG. 5, the mounting position of the on-vehicle camera is shifted from the center in the vehicle width direction. As a result, as shown in FIG. 6, the center line of a displayed image is not aligned with the center line of the vehicle. In this case, the user corrects the image using the operations unit 20 such that the center of the image in the horizontal direction is aligned with the center of the vehicle in the vehicle width direction. In some cases, the user may also adjust the rotation of the image and/or the look-down angle of the overhead image based on the mounting angle (yaw angle) in the vehicle width direction, the mounting angle (pitch angle) in the vertical direction, and the rotation angle (roll angle) about the optical axis of the on-vehicle camera. The user may further adjust graphics such as the vehicle width lines and the distance reference lines.

FIG. 7 is a top view of a parking space and a vehicle and is used to describe a case where more complex adjustments are performed on an image and graphics such as vehicle width lines and distance reference lines. As described with reference to FIG. 4, the vehicle width lines and the distance reference lines are superposed on image data obtained by the imaging unit 10. In a case where the on-vehicle camera includes a frame memory, adjustments as described below may be performed after taking a still image in a position as shown in FIG. 7 and moving the vehicle to a safer place.

In the related-art (see, for example, patent document 1), markers are placed in a parking space as shown in FIG. 7 and detailed adjustments of display parameters of an image and graphics are performed with reference to the markers. The markers are placed in positions at specific distances from the vehicle, in positions on the extensions of lines indicating the vehicle width, and in a position on the extension of the center line in the width direction of the vehicle. The user adjusts graphics by operating the operations unit 20 with reference to the markers. In the example shown in FIG. 7, the markers are placed in a position on the center line in the width direction of the vehicle, and at the intersections between the 50-cm, 1-m, and 2-m lines indicating distances from the rear end of the vehicle and the extensions of lines indicating the vehicle width. The user adjusts the graphics while looking at image data showing the markers. For example, the user adjusts, on the monitor screen, the positions of the vehicle width lines in the horizontal direction, the distance between the vehicle width lines, the angles of the vehicle width lines, and the positions of the distance reference lines. Although the 50-cm, 1-m, and 2-m lines are shown as distance reference lines in FIG. 7, the number and types of distance reference lines may vary. Two or more lines may be adjusted at the same time. For example, when adjusting the distance between the vehicle width lines, the positions of the right and left vehicle width lines may be adjusted at the same time. Alternatively, lines may be adjusted independently.

FIG. 8 is a table showing an example of initial parameters of vehicle width lines and distance reference lines. The table shows an example of factory default values indicating X-Y coordinates of initial and end points of the vehicle width lines and the distance reference lines as shown in FIG. 4. Values as shown in FIG. 8 are initially stored in the user information storing unit 40. The graphic superposing unit 32 reads the values from the user information storing unit 40 and based on the read values, draws and superposes the vehicle width lines and the distance reference lines on an image. The image and the superposed lines are displayed on the monitor as shown in FIG. 4.

The positional relationships between an image displayed on the monitor and graphics superposed on the image may change depending on the mounting position and angle of the on-vehicle camera. FIG. 9 shows an image on which graphics are superposed using the default values shown in FIG. 8. In FIG. 8, the vehicle width lines and the distance reference lines are not aligned with the markers placed on the ground surface in the parking space. In such a case, the user has to correct the misalignment by using the operations unit 20.

The user operates the operations unit 20 with reference to the markers placed in the parking space to adjust the horizontal positions and angles of the vehicle width lines and the distance between the vehicle width lines such that the vehicle width lines correctly indicate the vehicle width, and to adjust the positions of the distance reference lines such that the distance reference lines correctly indicate distances from the vehicle. More particularly, the user adjusts the vehicle width lines and the distance reference lines using the adjustment menus in the adjustment mode of the on-vehicle camera shown in FIG. 3.

With the "width-line horizontal position adjustment" menu, the user adjusts the horizontal positions of the vehicle width lines by simultaneously moving the right and left vehicle width lines in the horizontal direction on the monitor. With the "width-line angle adjustment" menu, the user adjusts the angles of the right and left vehicle width lines simultaneously such that the angles become symmetric on the monitor. With the "width-line distance adjustment" menu, the user moves the right and left vehicle width lines simultaneously to adjust the distance between the vehicle width lines such that they become symmetric on the monitor. With the "distance reference line adjustment" menu, the user adjusts the vertical positions of the distance reference lines individually or collectively. The graphic superposing unit 32 calculates intersections between the vehicle width lines and the distance reference lines such that they are correctly aligned.

FIG. 10 shows an image and superposed graphics displayed on the monitor after the above adjustments. FIG. 11 shows X-Y coordinates of the initial and end points of the vehicle width lines and the distance reference lines after the adjustments.

After making the adjustments, the user switches the on-vehicle camera from the adjustment mode to the normal display mode. As a result, the adjusted parameters are stored in the user information storing unit 40. When the on-vehicle camera is turned on next time, the image processing unit 31 and the graphic superposing unit 32 read the adjusted parameters from the user information storing unit 40 and display an image as shown in FIG. 10.

In the related-art, display parameters of an image and graphics such as vehicle width lines and distance reference lines displayed on the monitor are corrected or adjusted as described above. With the related-art configuration, however, the user has to perform complex and various adjustments by himself/herself.

According to a technology disclosed in patent document 2, a table associating vehicle types and mounting positions of a camera with display positions of distance marks is stored in a storage unit, the mounting height (Y) of the camera is determined based on vehicle information and a mounting position input via an operations unit, and the corresponding display positions of the distance marks are read from the storage unit based on the mounting height (Y). In patent document 2, however, it is assumed that the mounting angle (pitch angle) of the camera is fixed. Accordingly, patent document 2 is silent about how to deal with a case where the mounting angle (pitch angle) of a camera is varied. Also, patent document 2 does not disclose a method or a configuration for adjusting images and vehicle width lines. Thus, even with the technology disclosed in patent document 2, the user has to perform complex adjustments based on the mounting position, the mounting height, and/or the mounting angle of a camera.

SUMMARY OF THE INVENTION

An aspect of the present invention provides an image adjusting device for an on-vehicle camera mounted on a vehicle. The image adjusting device includes an operations unit configured to input mounting position information regarding a mounting position of the on-vehicle camera on the vehicle; a storing unit configured to store image processing parameters in association with various mounting positions of the on-vehicle camera; a control unit configured to read the corresponding image processing parameters from the storing unit based on the mounting position information input from the operations unit; and an image processing unit configured to process image data obtained by an imaging unit of the on-vehicle camera according to the image processing parameters read by the control unit.

Another aspect of the present invention provides an image adjusting method for an on-vehicle camera mounted on a vehicle. The method includes an operations step of inputting mounting position information regarding a mounting position of the on-vehicle camera on the vehicle; a storing step of storing image processing parameters in a storing unit in association with various mounting positions of the on-vehicle camera; a control step of reading the corresponding image processing parameters from the storing unit based on the mounting position information input in the operations step; and an image processing step of processing image data obtained by an imaging unit of the on-vehicle camera according to the image processing parameters read in the control step.

BRIEF DESCRIPTION OF THE DRAWINGS

FIG. 8 is a table showing an example of initial parameters of vehicle width lines and distance reference lines;

FIG. 11 is a table showing parameters of vehicle width lines and distance reference lines after adjustment;

FIG. 17 is an exemplary graphic processing parameter table stored in an initial parameter storage unit;

FIG. 18 is a table showing an example of actual graphic processing parameters indicated by a pointer;

FIG. 19 is a table showing another example of actual graphic processing parameters indicated by a pointer;

FIG. 20 is an exemplary image processing parameter table stored in an initial parameter storage unit;

DESCRIPTION OF THE PREFERRED EMBODIMENTS

Preferred embodiments of the present invention are described below with reference to the accompanying drawings.

Figure 1:
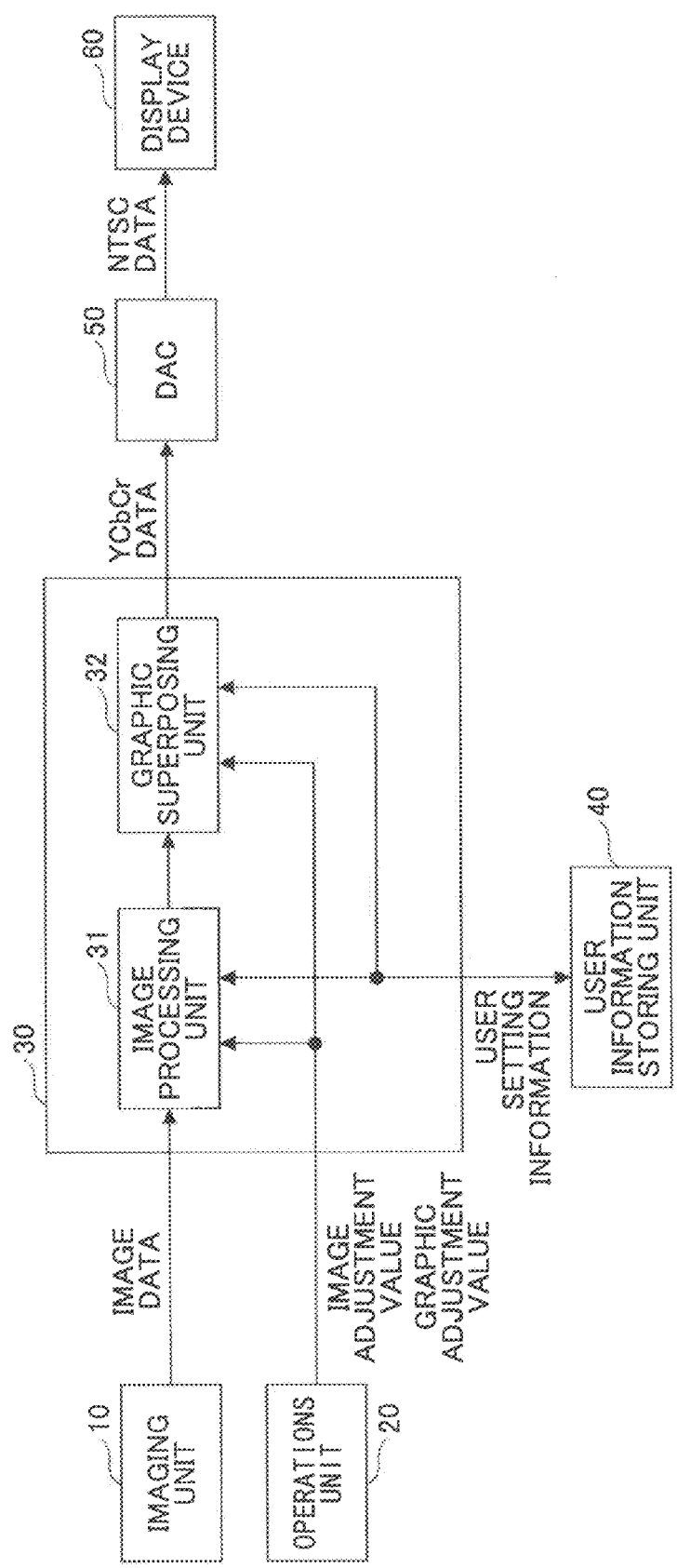
FIG. 1 is a block diagram of a related-art on-vehicle camera.
Figure 2:
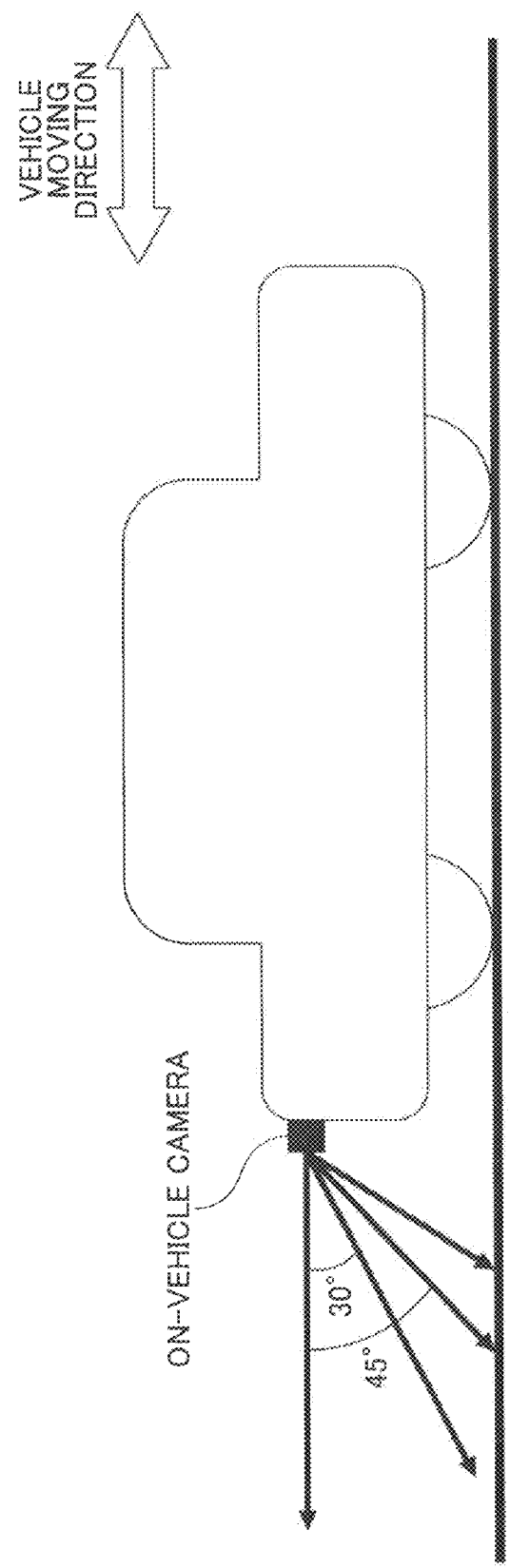
FIG. 2 is a drawing illustrating various mounting angles of an on-vehicle camera.
Figure 12:
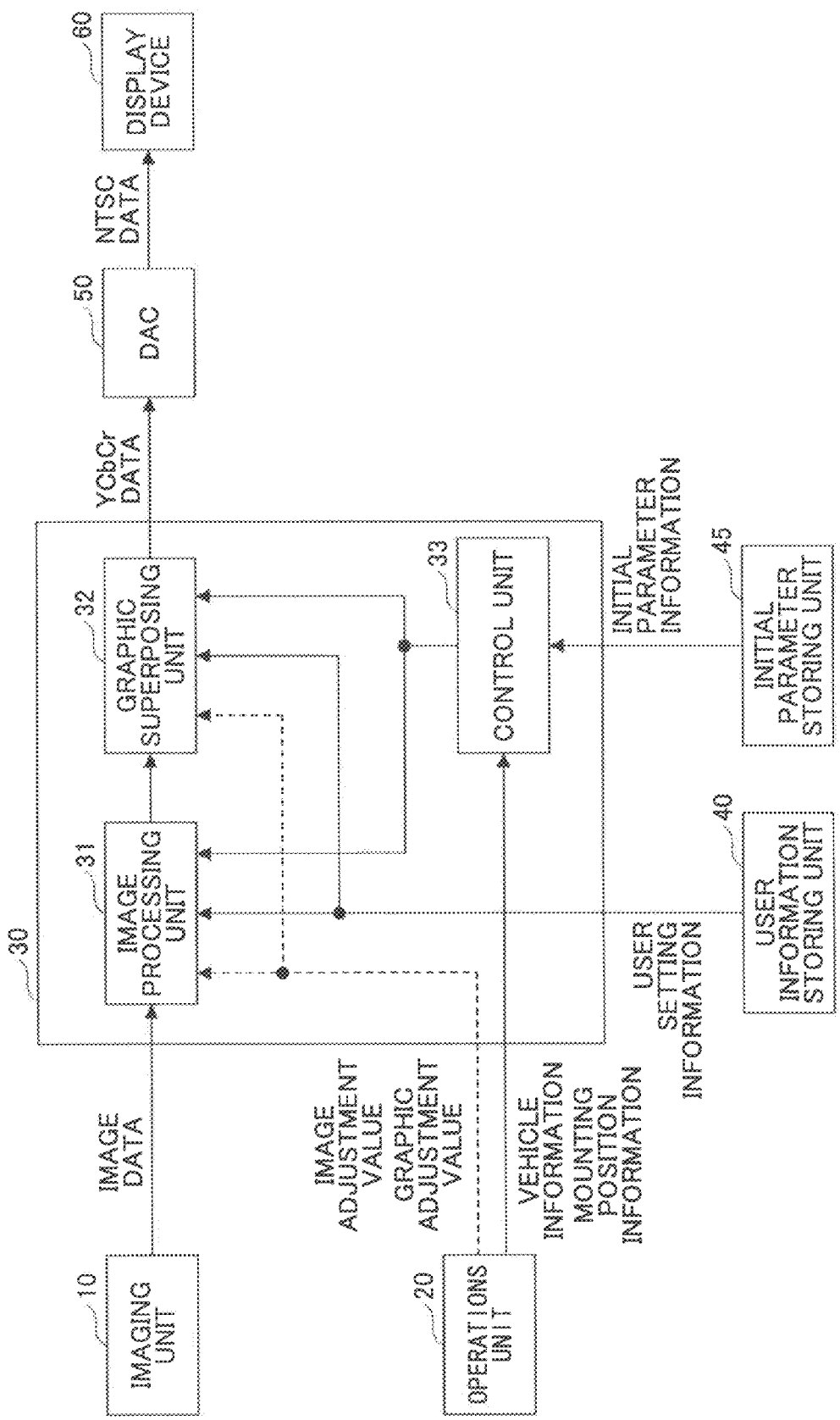
FIG. 12 is a block diagram of an on-vehicle camera according to an embodiment of the present invention.

FIG. 12 is a block diagram illustrating a hardware configuration of an on-vehicle camera according to an embodiment of the present invention. As shown in FIG. 12, the on-vehicle camera of this embodiment has a configuration similar to that of the related-art on-vehicle camera shown in FIG. 1 and includes an imaging unit 10, an operations unit 20, an image processor 30, a user information storing unit 40, and a DAC 50. A display device 60 may be provided separately from the on-vehicle camera or may be provided as a component of the on-vehicle camera. Different from the related-art on-vehicle camera of FIG. 1, the on-vehicle camera of this embodiment further includes an initial parameter storing unit 45. Also, the image processor 30 of this embodiment includes a control unit 33 in addition to an image processing unit 31 and a graphic superposing unit 32. The operations unit 20, the control unit 33, the initial parameter storing unit 45, and at least one of the image processing unit 31 and the graphic superposing unit 32 constitute an image adjusting device of this embodiment. As described later, the initial parameter storing unit 45 stores initial parameter information including image processing parameters and graphic processing parameters corresponding to various vehicle widths and various mounting positions (mounting angles, mounting heights, mounting position deviations, etc.) of the on-vehicle camera. The user information storing unit 40 stores user setting information including image processing parameters and graphic processing parameters set by the user.

The user information storing unit 40 and the initial parameter storing unit 45 may be implemented by one memory. For example, the user information storing unit 40 and the initial parameter storing unit 45 may be implemented by a rewritable nonvolatile memory such as an EEPROM or a flash memory. Alternatively, the user information storing unit 40 and the initial parameter storing unit 45 may be implemented by separate memories. In this case, the initial parameter storing unit 45 may be implemented by a read-only memory (ROM).

The imaging unit 10 takes an image of a scene behind the vehicle and sends the obtained image data to the image processor 30. In the normal display mode, the image processing unit 31 performs image processing on the image data sent from the imaging unit 10 based on the image processing parameters in the user setting information stored in the user information storing unit 40. The image processing, for example, includes Bayer interpolation, correction of chromatic aberration of magnification, YUV conversion, distortion correction, and overhead image generation. The graphic superposing unit 32 superposes graphics such as vehicle width lines and distance reference lines based on the graphic processing parameters in the user setting information stored in the user information storing unit 40. The processed image data with superposed graphics such as vehicle width lines and distance indicating lines are sent to the DAC 50. The DAC 50 converts the image data from digital to analog and outputs the converted image data as an NTSC signal to the display device 60, and the display device 60 displays the image data.

In the adjustment mode, the user operates the operations unit 20 to input vehicle information including a vehicle type or a vehicle width and mounting position information such as mounting angles (pitch angle, yaw angle, and toll angle), a mounting height (Y), and a mounting position deviation (X) of the on-vehicle camera. The vehicle information and the mounting position information may be input by selecting options displayed on the display device 60 using the operations unit 20. Alternatively, the user may input values directly from the operations unit 20. The control unit 33 reads the corresponding image processing parameters and/or graphic processing parameters from the initial parameter storing unit 45 based on the vehicle information and the mounting position information of the on-vehicle camera input from the operations unit 20, and sends the read parameters as initial parameter information to the image processing unit 31 and/or the graphic superposing unit 32. The image processing unit 31 adjusts, for example, the horizontal position of the image data and the look-down angle of an overhead image based on the image processing parameters in the initial parameter information sent from the control unit 33. The graphic superposing unit 32 adjusts the graphics such as the vehicle width lines and the distance reference lines to be superposed on the image data based on the graphic processing parameters in the initial parameter information sent from the control unit 33.

Thus, in this embodiment, the image processing unit 31 and the graphic superposing unit 32 perform adjustments on the image data and the graphics such as the vehicle width lines and the distance reference lines. In other words, the user does not have to perform complex adjustments by using the operations unit 20 as in the related art described with reference to FIG. 3.

The image processing parameters and the graphic processing parameters used in the adjustments are stored as user setting information in the user information storing unit 40. When the on-vehicle camera is turned on next time, the image processing unit 31 processes image data and the graphic superposing unit 32 processes graphics including the vehicle width lines and the distance reference lines based on the user setting information stored in the user information storing unit 40.

When needed, the user may also input image adjustment values and graphic adjustment values from the operations unit 20 to make fine adjustments to the image data, the vehicle width lines, and the distance reference lines that have been adjusted as described above based on the initial parameter information in the initial parameter storing unit 45. Even in this case, the workload of the user is far lower than that in the related art. When image adjustment values and/or graphic adjustment values are input by the user, the user setting information in the user information storing unit 40 is modified by the input values. This configuration makes it possible to more accurately adjust the image data, the vehicle width lines, and the distance indicating lines.

Exemplary adjustment of image data and graphics such as vehicle width lines and distance reference lines is described below.

Figure 13:
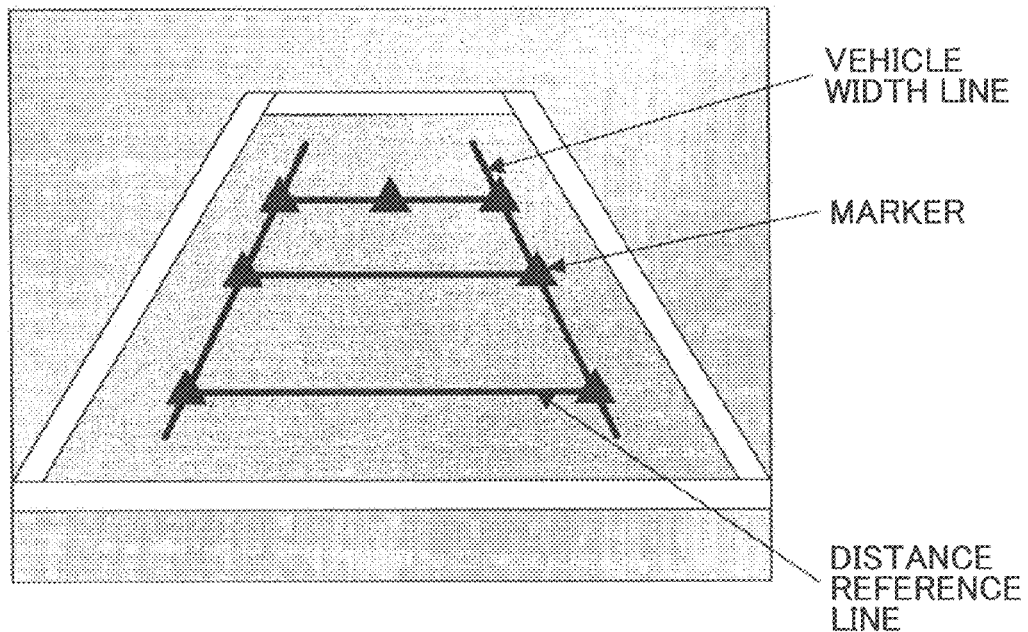
FIG. 13 is a drawing illustrating an exemplary image displayed when an on-vehicle camera is mounted normally on a normal vehicle.

FIG. 13 is a drawing illustrating an exemplary image displayed on the display device (monitor) 60 when the on-vehicle camera is mounted normally on a normal vehicle. In FIG. 13, it is assumed that the normal vehicle has a width of 1600 mm and the on-vehicle camera is mounted on the center of the rear of the vehicle in the vehicle width direction at a height of 60 cm and a vertical angle of 45 degrees with respect to the ground surface (here, these parameters are collectively called a normal mounting position). The user information storage unit 40 stores default user setting information including image processing parameters and graphic processing parameters corresponding to the normal mounting position. The image processing unit 31 performs image processing on image data and the graphic superposing unit 32 superposes vehicle width lines and distance reference lines on the imaged data based on the default user setting information. In FIG. 13, since the on-vehicle camera is mounted on the normal vehicle in the normal mounting position, the markers and the vehicle width lines and the distance reference lines are correctly aligned in an image displayed on the monitor.

Figure 14:
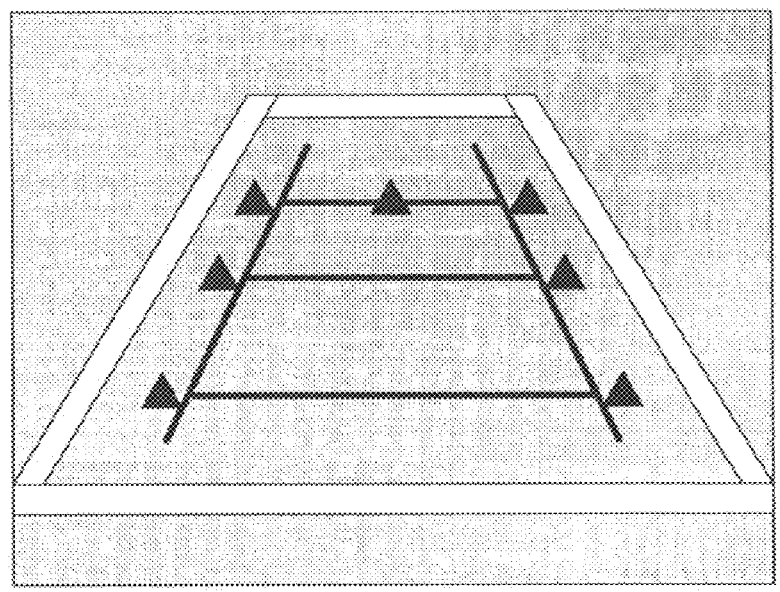
FIG. 14 is a drawing illustrating an exemplary image displayed when an on-vehicle camera is mounted on a wide vehicle.
Figure 15:
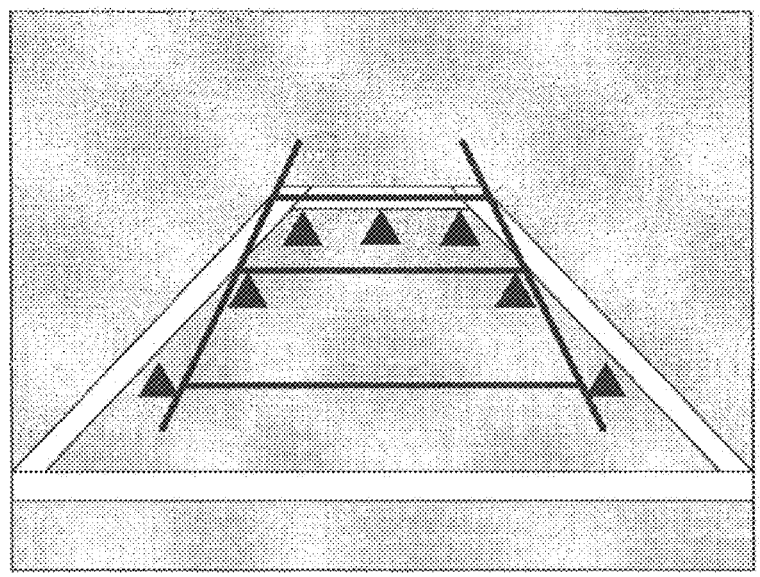
FIG. 15 is a drawing illustrating an exemplary image displayed when the mounting angle of an on-vehicle camera is set at a small value.
Figure 16:
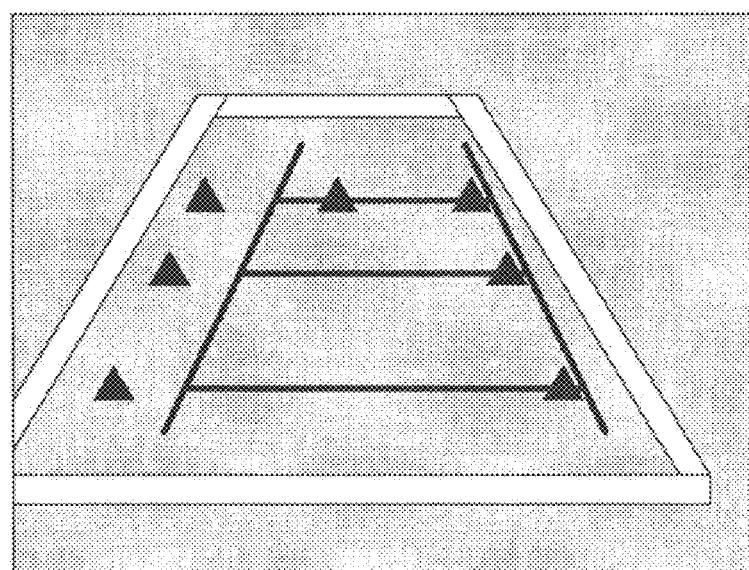
FIG. 16 is a drawing illustrating an exemplary image displayed when the mounting position of an on-vehicle camera is off center in the vehicle width direction.

As another example, let us assume a case where the on-vehicle camera is mounted on a wide vehicle with a width of 1700 mm that is greater than the width of the normal vehicle. When the on-vehicle camera is mounted on the center in the width direction of the wide vehicle at a height of 60 cm and a vertical angle of 45 degrees, an image as shown in FIG. 14 is displayed on the monitor. In the same example, if the vertical angle of the on-vehicle camera is set at 30 degrees, an image as shown in FIG. 15 is displayed on the monitor. Also in the same example, if the mounting position of the on-vehicle camera is shifted from the center in the vehicle width direction, an image as shown in FIG. 16 is displayed on the monitor.

Figure 3:
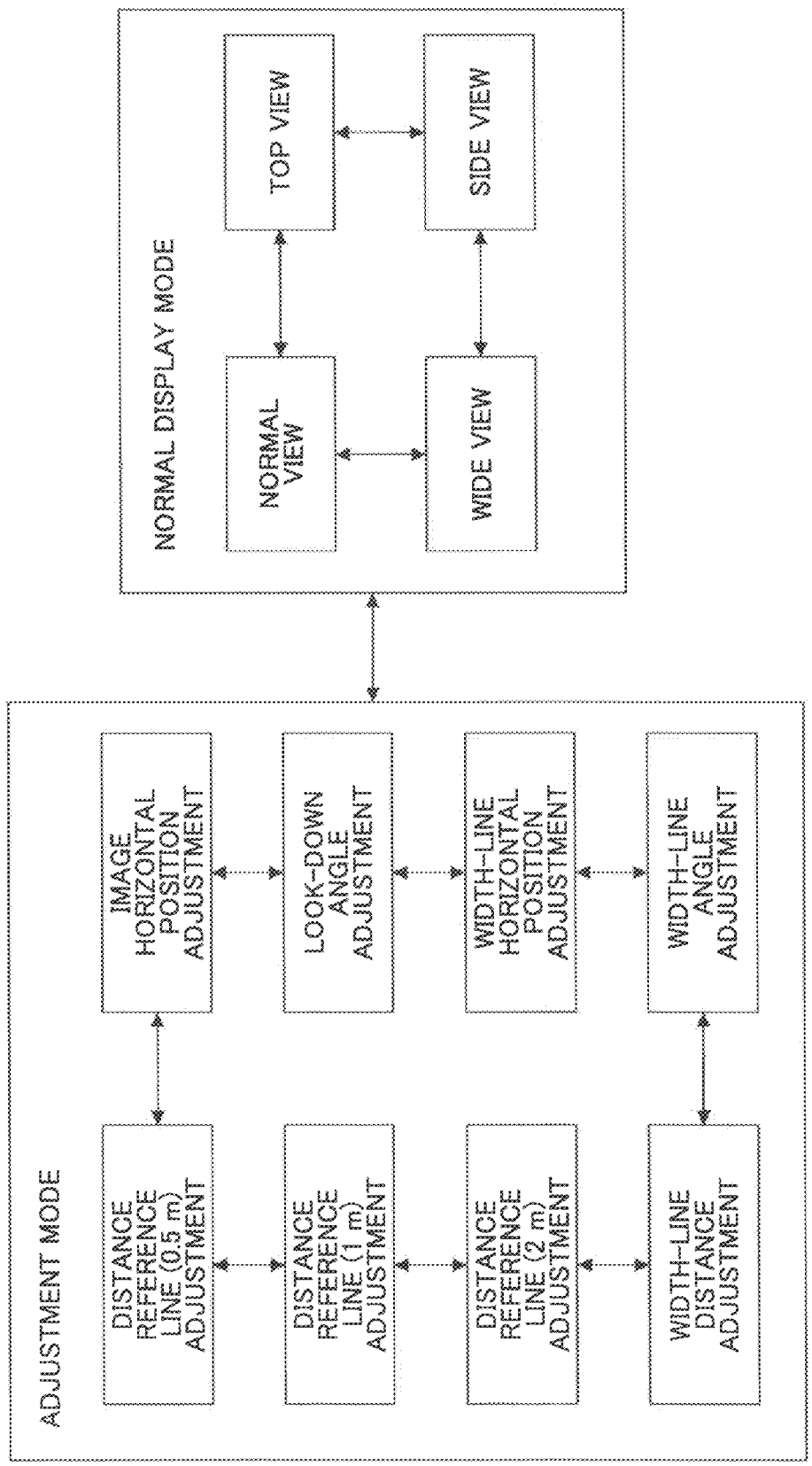
FIG. 3 is a drawing illustrating display modes of a related-art on-vehicle camera.
Figure 4:
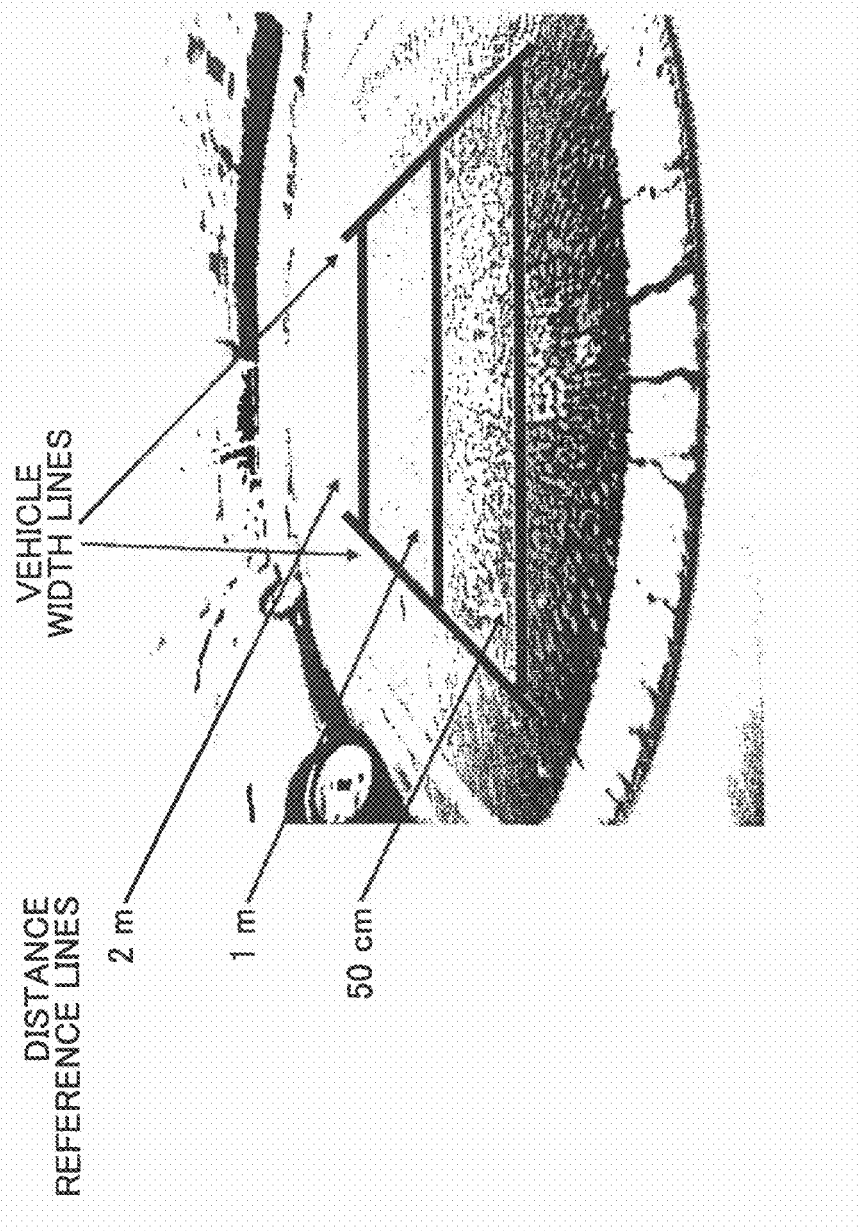
FIG. 4 is a drawing illustrating vehicle width lines and distance reference lines superposed on an image.
Figure 5:
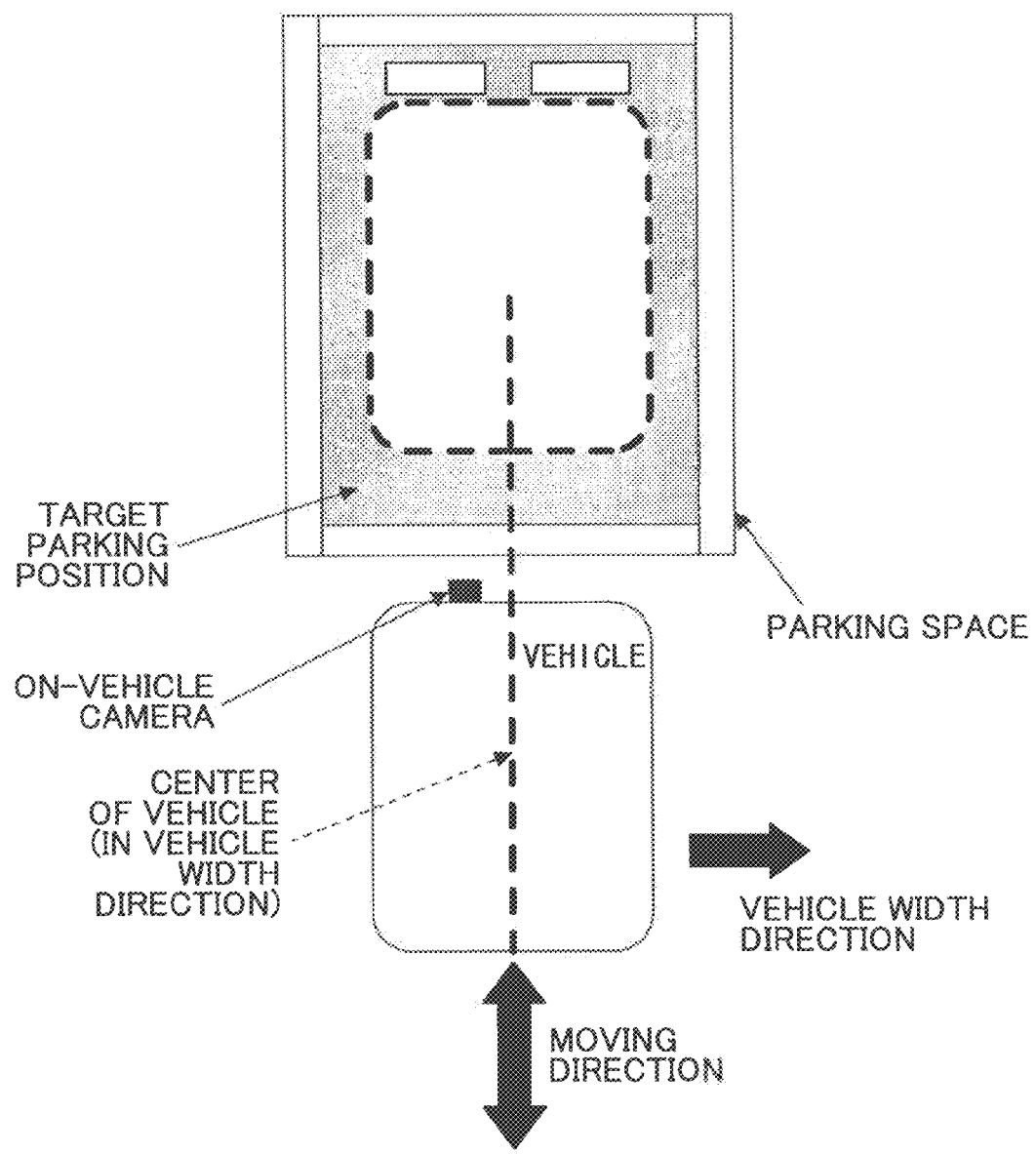
FIG. 5 is a drawing illustrating a parking space and a vehicle.
Figure 6:
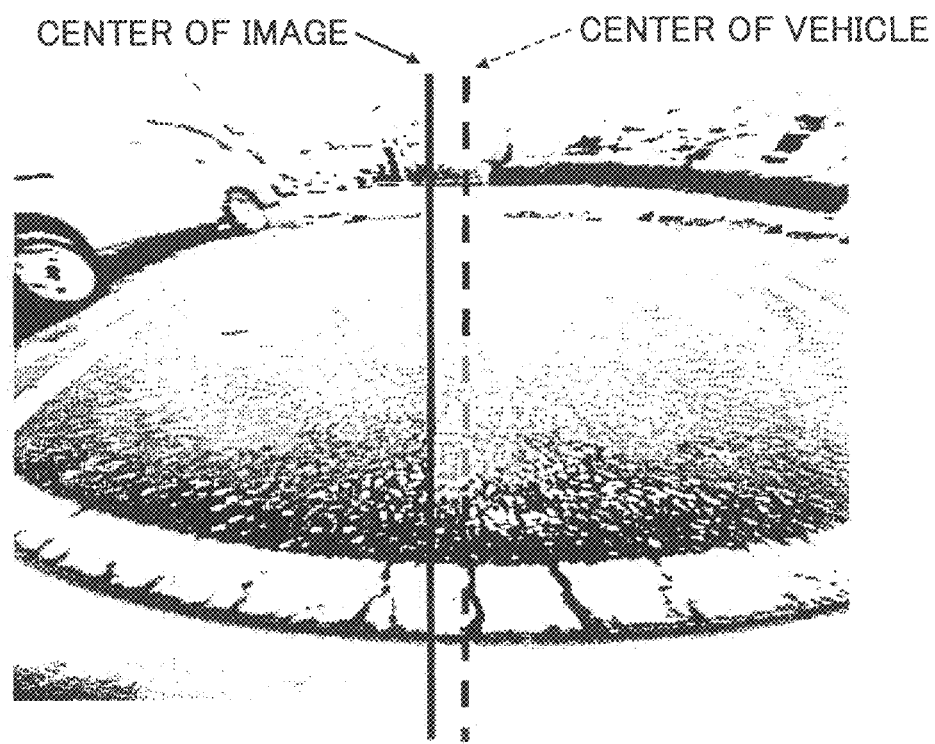
FIG. 6 is a drawing used to describe correction of the horizontal position of an image.
Figure 7:
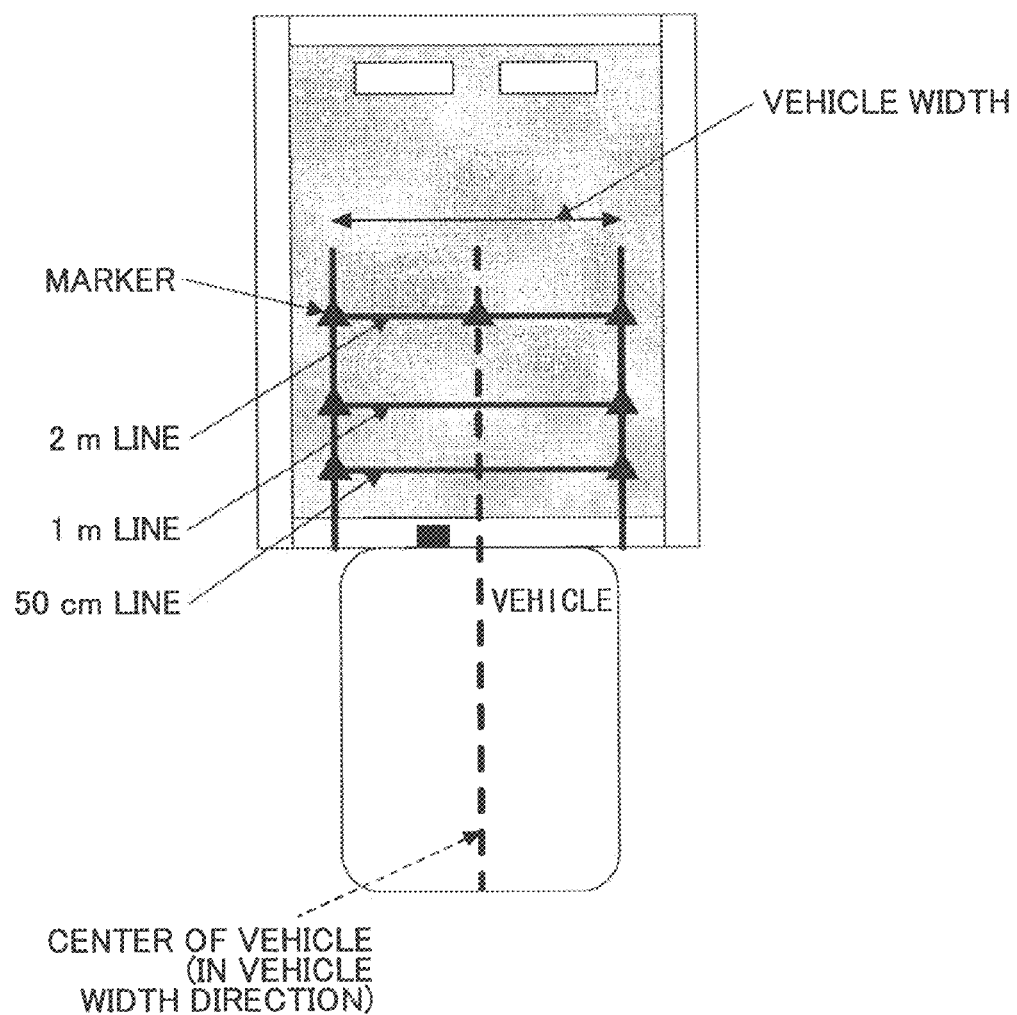
FIG. 7 is a drawing used to describe a related-art method of adjusting an image and graphics.
Figure 9:
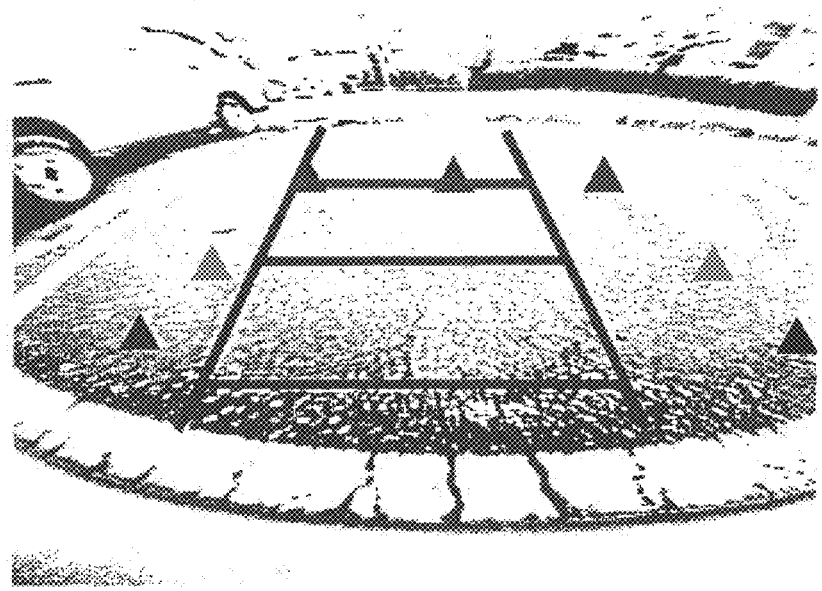
FIG. 9 is a drawing used to describe adjustment of vehicle width lines and distance reference lines in an adjustment mode of a related-art on-vehicle camera (before adjustment)
Figure 10:
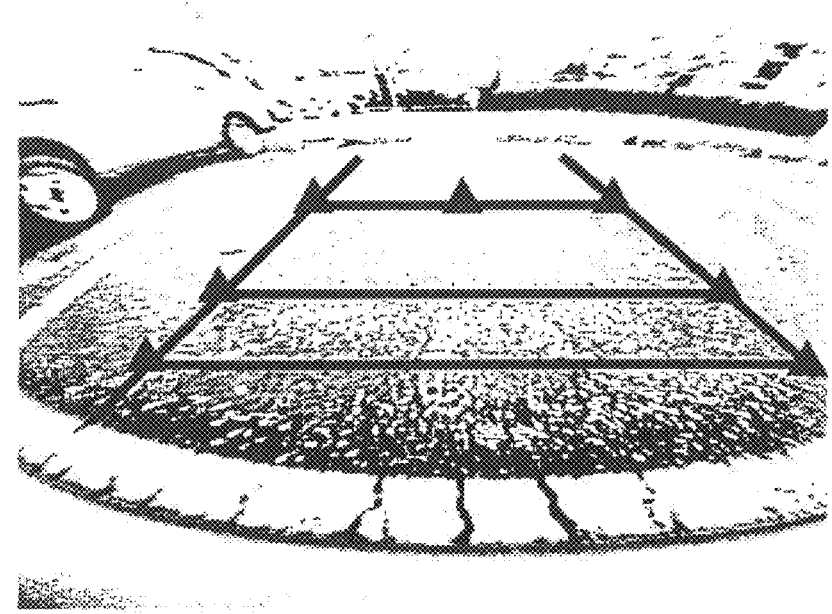
FIG. 10 is a drawing used to describe adjustment of vehicle width lines and distance reference lines in an adjustment mode of a related art on-vehicle camera (after adjustment)

In the related art, as described with reference to FIG. 3, the user switches the on-vehicle camera to the adjustment mode, adjusts the horizontal position of the image, and also adjusts the positions of the vehicle width lines and the distance reference lines such that they are aligned with the markers placed in the parking space.

Meanwhile, with the configuration of this embodiment shown by FIG. 12, once the user enters via the operations unit 20 the vehicle information (e.g., vehicle width) and the mounting position information (e.g., mounting angle, mounting height, and mounting position deviation) of the on-vehicle camera, appropriate image processing parameters and/or graphic processing parameters are uniquely identified. Then, the image processing unit 31 determines, for example, a correction value for the horizontal position of the image based on the image processing parameters and adjusts the horizontal position of the image based on the determined correction value. Also, the graphic superposing unit 32 determines, for example, the horizontal positions of the vehicle width lines, the distance between the vehicle width lines, and the positions of the distance reference lines based on the graphic processing parameters, and superposes the lines (or graphics) on the image data based on the determined values. Thus, this embodiment eliminates the need for the user to perform complex adjustments.

Below, exemplary adjustments of the distance between the vehicle width lines, the angles of the vehicle width lines, and the positions of the distance reference lines are described.

FIG. 17 shows an exemplary table (graphic processing parameter table) including graphic processing parameters stored as initial parameter information in the initial parameter storing unit 45. The positions and angles of the vehicle width lines and the positions of the distance reference lines vary depending on the vehicle width and the vertical mounting angle and the mounting height of the on-vehicle camera. In other words, once the vehicle width and the vertical mounting angle and the mounting height of the on-vehicle camera are determined, graphic processing parameters are uniquely identified.

In FIG. 17, graphic processing parameters for adjusting the distance between the vehicle width lines, the angles of the vehicle width lines, and the positions of the distance reference lines are associated with various vehicle widths and various vertical mounting angles and mounting heights of the on-vehicle camera. Here, it is assumed that the graphic processing parameters in FIG. 17 are pointers that point to tables stored in another area of the initial parameter storing unit 45 and including positions (coordinates) of the vehicle width lines and the distance reference lines. For example, when the vehicle width is 1600 mm, the mounting angle is 45 degrees, and the mounting height is 60 cm, the corresponding graphic processing parameter in FIG. 17 is 30 that points to a table as shown by FIG. 18. As another example, when the vehicle width is 1700 mm, the mounting angle is 30 degrees, and the mounting height is 60 cm, the corresponding graphic processing parameter in FIG. 17 is 44 that points to a table as shown by FIG. 19. The table of FIG. 18 is the same as the table of FIG. 8 and includes default values used when the on-vehicle camera is mounted on a normal vehicle (with a vehicle width of 1600 mm) at a normal position (at a mounting angle of 45 degrees and a mounting height of 60 cm).

Using pointers as the graphic processing parameters as shown in FIG. 17 makes it possible to simplify the table structure. Also, this configuration makes it possible to point to the same table by different graphic processing parameters and thereby to save memory. Alternatively, the table shown in FIG. 17 may include information as shown in FIGS. 18 and 19 as the graphic processing parameters. Also, the vehicle width information in FIG. 17 may be replaced with vehicle types. In the present application, vehicle widths and/or vehicle types are called vehicle information.

Let us assume that a vehicle width of 1600 mm (a normal vehicle), a mounting angle (pitch angle) of 45 degrees, and a mounting height (Y) of 60 cm are default values. If the on-vehicle camera is mounted on the center in the width direction of a vehicle with a width of 1700 mm at a mounting angle (pitch angle) of 30 degrees and a mounting height (Y) of 60 cm, the user inputs, via the operations unit 20, a vehicle width of 1700 mm as the vehicle width information and a mounting angle (pitch) of 30 degrees and a mounting height (Y) of 60 cm as the mounting position information of the on-vehicle camera. If the control unit 33 is configured to retain the most-recently input vehicle width information and mounting position information, the user may input only the information (in this case, a vehicle width of 1700 mm and a mounting angle of 30 degrees) to be changed.

Based on the vehicle width information and the mounting position information of the on-vehicle camera input from the operations unit 20, the control unit 33 of the image processor 30 reads the corresponding graphic processing parameter(s) from the graphic processing parameter table in the initial parameter storing unit 45, and sends the read graphic processing parameter(s) to the graphic superposing unit 32. More particularly, in this example, the control unit 33 obtains a graphic processing parameter of 44 from the graphic processing parameter table of FIG. 17 based on the vehicle width of 1700 mm, the mounting angle of 30 degrees, and the mounting height of 60 cm, and using the obtained graphic processing parameter as a pointer, obtains X-Y coordinates of the initial and end points of the vehicle width lines and the distance reference lines from a table of FIG. 19. Then, the control unit 33 sends the obtained X-Y coordinates (actual graphic processing parameters) to the graphic superposing unit 32.

Figure 21:
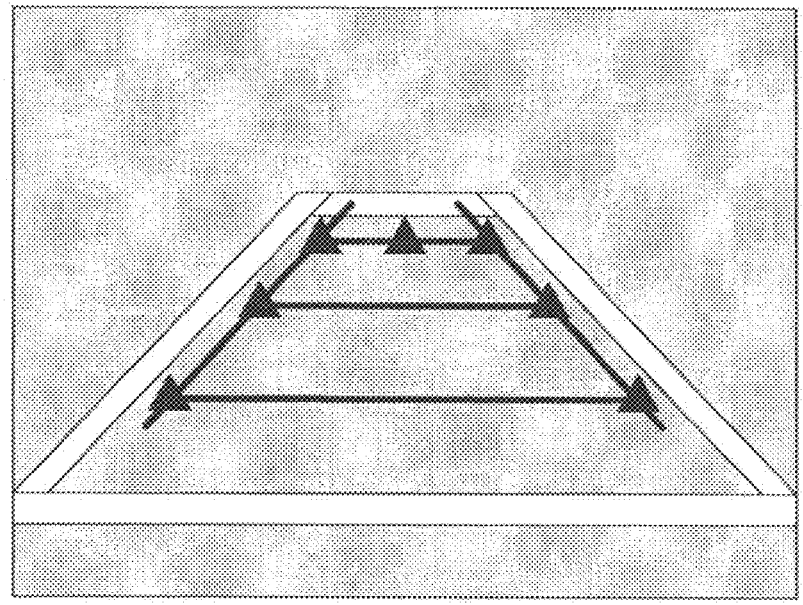
FIG. 21 is a drawing illustrating an image displayed after adjusting the image of FIG. 14 or FIG. 15.

Based on the (actual) graphic processing parameters sent from the control unit 33, the graphic superposing unit 32 adjusts the horizontal positions of the vehicle width lines, the distance between the vehicle width lines, and the positions of the distance reference lines, and superposes the vehicle width lines and the distance reference lines on image data. FIG. 21 shows an image displayed on the monitor after adjusting the image shown in FIG. 14 or FIG. 15.

Next, adjustment of image data is described. FIG. 20 shows an exemplary table (image processing parameter table) including image processing parameters stored as initial parameter information in the initial parameter storing unit 45. An image taken by an on-vehicle camera has to be adjusted, for example, according to the mounting position (X), the mounting height (Y), and the mounting angle (pitch angle) of the on-vehicle camera. Also, the image processing algorithm for an overhead image as seen from above may vary depending on the mounting height (Y) and the mounting angle (pitch angle) of the on-vehicle camera. To generate an accurate overhead image, it is preferable to select image processing parameters corresponding to the mounting height (Y) and the mounting angle (pitch angle) of the on-vehicle camera. Thus, variables related to adjustment of image data include the vertical mounting angle (pitch angle), the mounting height (Y), and the mounting position (X) in the vehicle width direction of the on-vehicle camera. The vehicle width is not directly related to adjustment of image data.

In FIG. 20, image processing parameters are associated with vertical mounting angles, mounting heights, and mounting positions in the vehicle width direction (mounting position deviations) of the on-vehicle camera. In this example, for brevity, mounting heights of 40 cm, 60 cm, and 80 cm are only shown. However, the image processing parameter table may include mounting heights of 40 cm through 160 cm as shown in the graphic processing parameter table of FIG. 17. The mounting position deviation indicates the amount of shift of the on-vehicle camera from the center in the vehicle width direction. For example, the mounting position deviation is represented by a positive value when the mounting position is shifted to the right or represented by a negative value when the mounting position is shifted to the left.

The image processing parameters in FIG. 20 may be pointers to actual image processing parameters (such as corrected horizontal positions and overhead image processing parameters) stored in another area of the initial parameter storing unit 45. Alternatively, the image processing parameter table may include the actual image processing parameters.

Let us assume a case where the mounting angle of the on-vehicle camera is 30 degrees, the mounting height is 60 cm, and the mounting position is shifted by 10 cm from the center in the vehicle width direction to the right. In this case, the user inputs, via the operations unit 20, a mounting angle of 30 degrees, a mounting height of 60 cm, and a mounting position deviation of +10 cm as the mounting position information of the on-vehicle camera. If the control unit 33 is configured to retain the most-recently input vehicle information (such as a vehicle width or a vehicle type) and mounting position information, the user may input only the information to be changed.

Based on the mounting position information of the on-vehicle camera input from the operations unit 20, the control unit 33 of the image processor 30 reads the corresponding image processing parameter(s) from the image processing parameter table in the initial parameter storing unit 45, and sends the read image processing parameter(s) to the image processing unit 31. In this example, the control unit 33 obtains an image processing parameter of 12 from the image processing parameter table shown by FIG. 20 based on the mounting angle of 30 degrees, the mounting height of 60 cm, and the mounting position deviation of +10 cm, and sends the obtained image processing parameter to the image processing unit 31.

Figure 22:
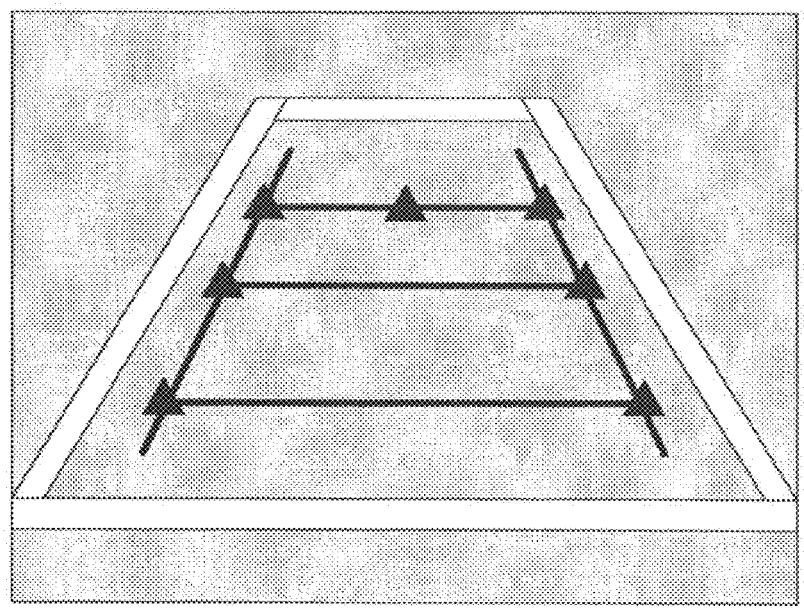
FIG. 22 is a drawing illustrating an image displayed after adjusting the image of FIG. 16.

The image processing unit 31 calculates, for example, a correction value for the horizontal position of image data obtained by the imaging unit 10 based on the image processing parameter sent from the control unit 33, and performs image processing (e.g., coordinate conversion) on the image data based on the calculated correction value. FIG. 22 shows an image displayed on the monitor after adjusting the image shown in FIG. 16.

The image processing unit 31 may be configured to adjust the display area of an image on the monitor based on the image processing parameter sent from the control unit 33. For example, this configuration makes it possible to prevent a parking space displayed on the monitor becoming relatively small when the mounting height of the on-vehicle camera is high.

In the above examples, the adjustment of image data and the adjustment of vehicle width lines and distance reference lines are described separately to simplify the descriptions. Normally, however, the image processing parameter(s) and the graphic processing parameter(s) are determined in parallel based on the vehicle information (vehicle width or vehicle type) and the mounting position information (mounting angle, mounting height, and mounting position deviation) input from the operations unit 20, and the image data, the vehicle width lines, and the distance reference lines are adjusted simultaneously.

Let us assume a case where the user inputs, via the operations unit 20, a vehicle width of 1700 mm as the vehicle width information and a mounting angle of 30 degrees, a mounting height of 60 cm, and a mounting position deviation of +10 cm as the mounting position information of the on-vehicle camera. In this case, the control unit 33 of the image processor 30 obtains a graphic processing parameter of 44 from the graphic processing parameter table (as shown by FIG. 17) in the initial parameter storing unit 45 based on the vehicle width of 1700 mm, the mounting angle of 30 degrees, and the mounting height of 60 cm. Then, the control unit 33 obtains actual graphic processing parameters from a table as shown by FIG. 19 using the obtained graphic processing parameter as a pointer, and sends the obtained actual graphic processing parameters to the graphic superposing unit 32. Also, the control unit 33 obtains an image processing parameter of 12 from the image processing parameter table (as shown by FIG. 20) in the initial parameter storing unit 45 based on the mounting angle of 30 degrees, the mounting height of 60 cm, and the mounting position deviation of +10 cm. Then, the control unit 33 obtains actual image processing parameters using the obtained image processing parameter as a pointer, and sends the obtained actual image processing parameters to the image processing unit 31. Alternatively, the graphic processing parameter table and the image processing parameter table may include actual graphic processing parameters and actual image processing parameters. In this case, the control unit 33 obtains actual graphic processing parameters and actual image processing parameters directly from the graphic processing parameter table and the image processing parameter table. The image processing unit 31 adjusts, for example, an overhead image and the horizontal position of image data based on the (actual) image processing parameters sent from the control unit 33. In parallel with this process, the graphic superposing unit 32 adjusts, for example, the angles of the vehicle width lines, the distance between the vehicle width lines, and the positions of the distance reference lines, and superposes the lines on the image data.

As described above, the user may also input image adjustment values and graphic adjustment values from the operations unit 20 to make fine adjustments to the image, the vehicle width lines, and the distance reference lines that have been adjusted by the image processing unit 31 and the graphic superposing unit 32.

Next, how the graphic processing parameters and the image processing parameters change according to changes in the horizontal mounting position (X) and the vertical mounting position (Y) of the on-vehicle camera is described.

Generally, a pinhole camera model of a camera is represented by a formula as shown below.

$$s\begin{bmatrix} u \\ v \\ 1 \end{bmatrix} = \begin{bmatrix} f & 0 & 0 & 0 \\ 0 & f & 0 & 0 \\ 0 & 0 & 1 & 0 \end{bmatrix} \begin{bmatrix} X \\ Y \\ Z \\ 1 \end{bmatrix} \quad \text{FORMULA 1}$$

In formula 1, X, Y, and Z indicate points in a three-dimensional space, u and v indicate coordinates projected onto the image plane, f indicates a focal length, and s indicates a scalar.

$$P = \begin{bmatrix} f & 0 & 0 & 0 \\ 0 & f & 0 & 0 \\ 0 & 0 & 1 & 0 \end{bmatrix} \quad \text{FORMULA 2}$$

When the above projection matrix is represented by P, formula 1 is expressed as follows:

$$s\begin{bmatrix} u \\ v \\ 1 \end{bmatrix} = P\begin{bmatrix} X \\ Y \\ Z \\ 1 \end{bmatrix} \quad \text{FORMULA 3}$$

Assuming that the horizontal mounting position (X) is shifted ΔX and the vertical mounting position (Y) is shifted ΔY, formula 3 is changed as follows:

$$s\begin{bmatrix} u \\ v \\ 1 \end{bmatrix} = P\begin{bmatrix} X - \Delta X \\ Y - \Delta Y \\ Z \\ 1 \end{bmatrix} \quad \text{FORMULA 4}$$

With formula 4, it is possible to obtain coordinates (u, v) on the image plane that are corrected according to the shifts of mounting positions.

Next, how the graphic processing parameters and the image processing parameters change according to changes in the rotation angle (roll angle) $\phi$, the vertical angle (pitch angle) $\theta$, and the horizontal angle (yaw angle) $\varphi$ of the on-vehicle camera is described. When these angles are taken into account, formula 3 is expressed as follows:

$$s\begin{bmatrix}u\\v\\1\end{bmatrix} = PR^{-1}\begin{bmatrix}X\\Y\\Z\\1\end{bmatrix} \quad \text{FORMULA 5}$$

In formula 5, $R^{-1}$ indicates an inverse matrix of a rotation matrix R expressed by the following formula:

$$R = \begin{bmatrix}\cos\phi & -\sin\phi & 0\\ \sin\phi & \cos\phi & 0\\ 0 & 0 & 1\end{bmatrix}\begin{bmatrix}\cos\theta & 0 & \sin\theta\\ 0 & 1 & 0\\ -\sin\theta & 0 & \cos\theta\end{bmatrix}\begin{bmatrix}1 & 0 & 0\\ 0 & \cos\varphi & -\sin\varphi\\ 0 & \sin\varphi & \cos\varphi\end{bmatrix} \quad \text{FORMULA 6}$$

Here, it is assumed that a reference rotation angle (roll angle) with respect to the vehicle moving direction is 0 degrees, a reference vertical angle (pitch angle) is 45 degrees, and a reference horizontal angle (yaw angle) is 0 degrees; and the reference angles are represented by $\phi=0$ degrees, $\theta=0$ degrees, and $\varphi=0$ degrees. Based on this assumption, the rotational matrix R is obtained by substituting angular shifts from the reference angles for $\phi$, $\theta$, and $\varphi$ in the above formula, and coordinates on the image plane are calculated based on the obtained rotational matrix R.

Image processing parameters and graphic processing parameters may be calculated and stored in advance based on the above formulas and used to adjust images and graphics as described above. Alternatively, the control unit 33 may include the above formulas and be configured to calculate adjusted coordinates in real time.

An aspect of the present invention provides an image adjusting device, an image adjusting method, and an on-vehicle camera that make it possible to uniquely determine image processing parameters and graphic processing parameters based on the mounting position and angle of the on-vehicle camera and a vehicle type or width (or size), and to adjust image data obtained by the on-vehicle camera and graphics such as vehicle width lines and distance reference lines to be superposed on the image data based on the determined parameters. This in turn makes it possible to reduce the workload of the user in adjusting the image data and the graphics.

The present invention is not limited to the specifically disclosed embodiments, and variations and modifications may be made without departing from the scope of the present invention.

The present application is based on Japanese Priority Application No. 2009-063420 filed on Mar. 16, 2009, and Japanese Priority Application No. 2009-290955 filed on Dec. 22, 2009, the entire contents of which are hereby incorporated herein by reference.

What is claimed is:

1. An image adjusting device for an on-vehicle camera mounted on a vehicle, the image adjusting device comprising:
an operations unit configured to allow a user to input mounting position information regarding an initial mounting position of the on-vehicle camera on the vehicle from among various initial mounting positions of the on-vehicle camera that are available at a plurality of locations on the vehicle;
a storing unit configured to store image processing parameters in association with the various initial mounting positions of the on-vehicle camera that are available at a plurality of locations on the vehicle;
a control unit configured to read the corresponding image processing parameters from the storing unit based on the mounting position information input by the user from the operations unit; and
an image processing unit configured to process image data obtained by an imaging unit of the on-vehicle camera according to the image processing parameters read by the control unit.

2. The image adjusting device as claimed in claim 1, wherein
the operations unit is configured to input the mounting position information including one or more of a mounting height (Y) from a ground surface, a vertical mounting angle (pitch angle) with respect to the ground surface, a mounting position deviation (X) from a center in a width direction of the vehicle, a horizontal mounting angle (yaw angle), and a rotation angle (roll angle) with respect to a moving direction of the vehicle; and
the storing unit is configured to store the image processing parameters in association with one or more of the mounting height (Y), the vertical mounting angle (pitch angle), the mounting position deviation (X), the horizontal mounting angle (yaw angle), and the rotation angle (roll angle).

3. The image adjusting device as claimed in claim 1, wherein the storing unit is configured to store pointers to the image processing parameters in association with the various initial mounting positions of the on-vehicle camera that are available at a plurality of locations on the vehicle and to store the image processing parameters separately from the pointers.

4. The image adjusting device as claimed in claim 1, further comprising:
a graphic superposing unit, wherein
the operations unit is configured to also input vehicle information regarding a type or a width of the vehicle;
the storing unit is configured to also store graphic processing parameters in association with various sets of the vehicle information and the mounting position information;
the control unit is configured to also read the corresponding graphic processing parameters from the storing unit based on the vehicle information and the mounting position information input from the operations unit; and
the graphic superposing unit is configured to superpose vehicle width lines indicating the width of the vehicle and/or distance reference lines indicating distances from an end of the vehicle on the image data based on the graphic processing parameters read by the control unit.

5. The image adjusting device as claimed in claim 4, wherein the storing unit is configured to store pointers to the graphic processing parameters in association with the various sets of the vehicle information and the mounting position information and to store the graphic processing parameters separately from the pointers.

6. The image adjusting device as claimed in claim 4, wherein the storing unit is configured to store the graphic processing parameters including at least coordinates of initial and end points of the vehicle width lines and/or the distance reference lines.

7. An image adjusting method for an on-vehicle camera mounted on a vehicle, the method comprising:
inputting mounting position information regarding an initial mounting position of the on-vehicle camera on the vehicle from among various initial mounting positions of the on-vehicle camera that are available at a plurality of locations on the vehicle by a user;

storing image processing parameters in a storing unit in association with the various initial mounting positions of the on-vehicle camera that are available at a plurality of locations on the vehicle;

reading the corresponding image processing parameters from the storing unit based on the mounting position information input by the user in the inputting; and processing image data obtained by an imaging unit of the on-vehicle camera according to the image processing parameters read in the reading.

8. The method as claimed in claim 7, wherein
the mounting position information input in the inputting includes one or more of a mounting height (Y) from a ground surface, a vertical mounting angle (pitch angle) with respect to the ground surface, a mounting position deviation (X) from a center in a width direction of the vehicle, a horizontal mounting angle (yaw angle), and a rotation angle (roll angle) with respect to a moving direction of the vehicle; and the image processing parameters are stored in the storing unit in association with one or more of the mounting height (Y), the vertical mounting angle (pitch angle), the mounting position deviation (X), the horizontal mounting angle (yaw angle), and the rotation angle (roll angle).

9. The method as claimed in claim 7, wherein
pointers to the image processing parameters are stored in the storing unit in association with the various initial mounting positions of the on-vehicle camera that are available at a plurality of locations on the vehicle; and the image processing parameters are stored in the storing unit separately from the pointers.

10. The method as claimed in claim 7, further comprising:
graphic superposing, wherein
in the inputting, vehicle information regarding a type or a width of the vehicle is also input;

in the storing, graphic processing parameters are also stored in the storing unit in association with various sets of the vehicle information and the mounting position information;

in the reading, the corresponding graphic processing parameters are also read from the storing unit based on the vehicle information and the mounting position information input in the inputting; and in the graphic superposing, vehicle width lines indicating the width of the vehicle and/or distance reference lines indicating distances from an end of the vehicle are superposed on the image data based on the graphic processing parameters read in the reading.

11. The method as claimed in claim 10, wherein
pointers to the graphic processing parameters are stored in the storing unit in association with the various sets of the vehicle information and the mounting position information; and the graphic processing parameters are stored in the storing unit separately from the pointers.

12. The method as claimed in claim 10, wherein the graphic processing parameters stored in the storing unit include at least coordinates of initial and end points of the vehicle width lines and/or the distance reference lines.

13. An on-vehicle camera including the image adjusting device of claim 1.

* * * * *